US009927866B2

(12) United States Patent
Park et al.

(10) Patent No.: US 9,927,866 B2
(45) Date of Patent: Mar. 27, 2018

(54) METHOD AND SYSTEM FOR OPTIMIZING A CORE VOLTAGE LEVEL AND ENHANCING FREQUENCY PERFORMANCE OF INDIVIDUAL SUBCOMPONENTS FOR REDUCING POWER CONSUMPTION WITHIN A PCD

(71) Applicant: QUALCOMM INCORPORATED, San Diego, CA (US)

(72) Inventors: Hee Jun Park, San Diego, CA (US); Yiran Li, San Diego, CA (US); Inho Hwang, San Diego, CA (US); Young Hoon Kang, San Diego, CA (US); Joshua Stubbs, Boulder, CO (US); Sean Sweeney, Boulder, CO (US); R. Nicholson Gibson, Boulder, CO (US); Andrew J. Frantz, Redondo Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 14/187,270

(22) Filed: Feb. 22, 2014

(65) Prior Publication Data

US 2015/0143143 A1    May 21, 2015

Related U.S. Application Data

(60) Provisional application No. 61/907,382, filed on Nov. 21, 2013.

(51) Int. Cl.
*G06F 1/32* (2006.01)
*G06F 1/26* (2006.01)

(52) U.S. Cl.
CPC .............. *G06F 1/3296* (2013.01); *G06F 1/26* (2013.01); *G06F 1/324* (2013.01); *Y02B 60/1285* (2013.01)

(58) Field of Classification Search
None
See application file for complete search history.

(56) References Cited

U.S. PATENT DOCUMENTS

| | | | | |
|---|---|---|---|---|
| 5,787,294 A | * | 7/1998 | Evoy ..................... | G06F 1/3203 323/222 |
| 6,279,114 B1 | * | 8/2001 | Toombs .............. | G06F 12/1433 710/8 |

(Continued)

FOREIGN PATENT DOCUMENTS

WO    2013009439 A1    1/2013

OTHER PUBLICATIONS

Huang, S. et al, An optimal variable voltage scheduling, The 2002 45th Midwest Symposium on Circuits and Systems. MWSCAS-2002, Aug. 4, 2002, pp. I-479-82, vol. 1.

(Continued)

*Primary Examiner* — Paul J Yen
(74) *Attorney, Agent, or Firm* — Smith Tempel Blaha LLC/Qualcom

(57) ABSTRACT

A method and system for optimizing a core voltage level of a portable computing device ("PCD") and enhancing frequency performance of individual subcomponents are disclosed. A plurality of voltage values is determined for a plurality of subcomponents within the PCD. Next, a reduced set of voltage values may be calculated with a voltage aggregator based on the plurality of voltage values. An optimized voltage level for a shared power domain may then be determined by a voltage optimizer within the PCD from the reduced set of voltage values. A shared power domain may then be set to the optimized voltage level. Subsequently, an operating frequency of each subcomponent may be optimized with a frequency performance enhancer based on the optimized voltage level. An optimal power collapse (Continued)

duration may also be calculated by the frequency performance enhancer and set for each subcomponent from the optimal frequency.

30 Claims, 6 Drawing Sheets

(56) References Cited

U.S. PATENT DOCUMENTS

| | | |
|---|---|---|
| 6,952,748 B1 | 10/2005 | Guerrero, Jr. et al. |
| 7,962,183 B2 | 6/2011 | Sherman |
| 8,327,158 B2 | 12/2012 | Titiano et al. |
| 8,886,981 B1* | 11/2014 | Baumann ............... G06F 1/3203 |
| | | 713/323 |
| 9,383,804 B2 | 7/2016 | Salsbery et al. |
| 2001/0047382 A1* | 11/2001 | Sachedina ................ G06F 9/52 |
| | | 718/104 |
| 2006/0026447 A1 | 2/2006 | Naveh et al. |
| 2006/0190745 A1* | 8/2006 | Matsushima ......... G06F 1/3287 |
| | | 713/300 |
| 2006/0288241 A1* | 12/2006 | Felter .................... G06F 1/3203 |
| | | 713/300 |
| 2007/0005152 A1* | 1/2007 | Karr ......................... G06F 1/28 |
| | | 700/22 |
| 2008/0012583 A1 | 1/2008 | Audet et al. |
| 2008/0162770 A1 | 7/2008 | Titiano et al. |
| 2009/0249094 A1 | 10/2009 | Marshall et al. |
| 2012/0159496 A1 | 6/2012 | Dighe et al. |
| 2013/0155045 A1 | 6/2013 | Khodorkovsky et al. |
| 2013/0166924 A1 | 6/2013 | Yang et al. |
| 2015/0143148 A1 | 5/2015 | Park et al. |

OTHER PUBLICATIONS

International Search Report and Written Opinion—PCT/US2014/066956—ISA/EPO—dated Feb. 20, 2015.

* cited by examiner

METHOD AND SYSTEM FOR OPTIMIZING A CORE VOLTAGE LEVEL AND ENHANCING FREQUENCY PERFORMANCE OF INDIVIDUAL SUBCOMPONENTS FOR REDUCING POWER CONSUMPTION WITHIN A PCD

RELATED APPLICATIONS STATEMENT

This application is a non-provisional of and claims priority under 35 U.S.C. § 119(e) to U.S. Provisional Patent Application Ser. No. 61/907,382, filed on Nov. 21, 2013, entitled, "METHOD AND SYSTEM FOR OPTIMIZING A CORE VOLTAGE LEVEL OF A PCD AND ENHANCING FREQUENCY PERFORMANCE OF INDIVIDUAL SUBCOMPONENTS IN ORDER TO REDUCE POWER CONSUMPTION WITHIN THE PCD," the entire contents of which is hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palm-top computers, and other portable electronic devices.

Because PCDs are becoming necessities for people, optimal performance in terms of having sufficient energy to operate a PCD between recharging periods may be a significant factor from a user's perspective. Sufficient energy to operate a PCD on battery power is often dictated by the device's power consumption. And each subcomponent of a PCD, such as a camera and mobile display within a battery-powered PCD, ultimately consumes power and contributes to the overall power consumption and performance of the PCD.

One problem with conventional PCDs is that the highest voltage desired by a subcomponent of a PCD with the heaviest workload determines the voltage level of the entire PCD and its other subcomponents. This results in an electrical current leakage increase in those subcomponents which did not need the higher voltage requested by the single component with the heaviest workload.

For example, suppose a subcomponent of a PCD, like a camera, requests an increase in voltage because of spike in its workload. Meanwhile, other subcomponents of the PCD, such as the mobile display, internal circuit bus, and video encoder may not need an increase in their voltage. The increase in the voltage for these other subcomponents which do not have a heavy work load, compared to the camera with the heavy workload, results in significant electrical current leakage from these light workload components and hence, significant power loss from these light workload components for the PCD.

Accordingly, what is needed in the art is a method and system for optimizing a core voltage level of a PCD while enhancing frequency performance of individual subcomponents in order to reduce power consumption within the PCD.

SUMMARY OF THE DISCLOSURE

A method and system for optimizing a core voltage level of a portable computing device ("PCD") and enhancing frequency performance of individual subcomponents are disclosed. A plurality of voltage values is determined for a plurality of subcomponents within the PCD. Next, a reduced set of voltage values may be calculated with a voltage aggregator based on the plurality of voltage values. An optimized voltage level for a shared power domain may then be determined by a voltage optimizer within the PCD from the reduced set of voltage values. A shared power domain may then be set to the optimized voltage level. Subsequently, an operating frequency of each subcomponent may be optimized with a frequency performance enhancer based on the optimized voltage level. An optimal power collapse duration may also be calculated by the frequency performance enhancer and set for each subcomponent from the optimal frequency.

Each subcomponent of the PCD may comprise at least one of a camera, a display, a communication bus, a video coder, a video decoder, and a signal processor. The frequency performance enhancer may also estimate leakage power of a subcomponent based on at least one of temperature and the optimized voltage level. The frequency performance enhancer may also calculate any one of the following: a present workload of a subcomponent; a minimum operating frequency required to process the present workload; an ideal operating frequency available based on the optimized voltage level; and a maximum operating frequency available based on the optimized voltage level.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1A:
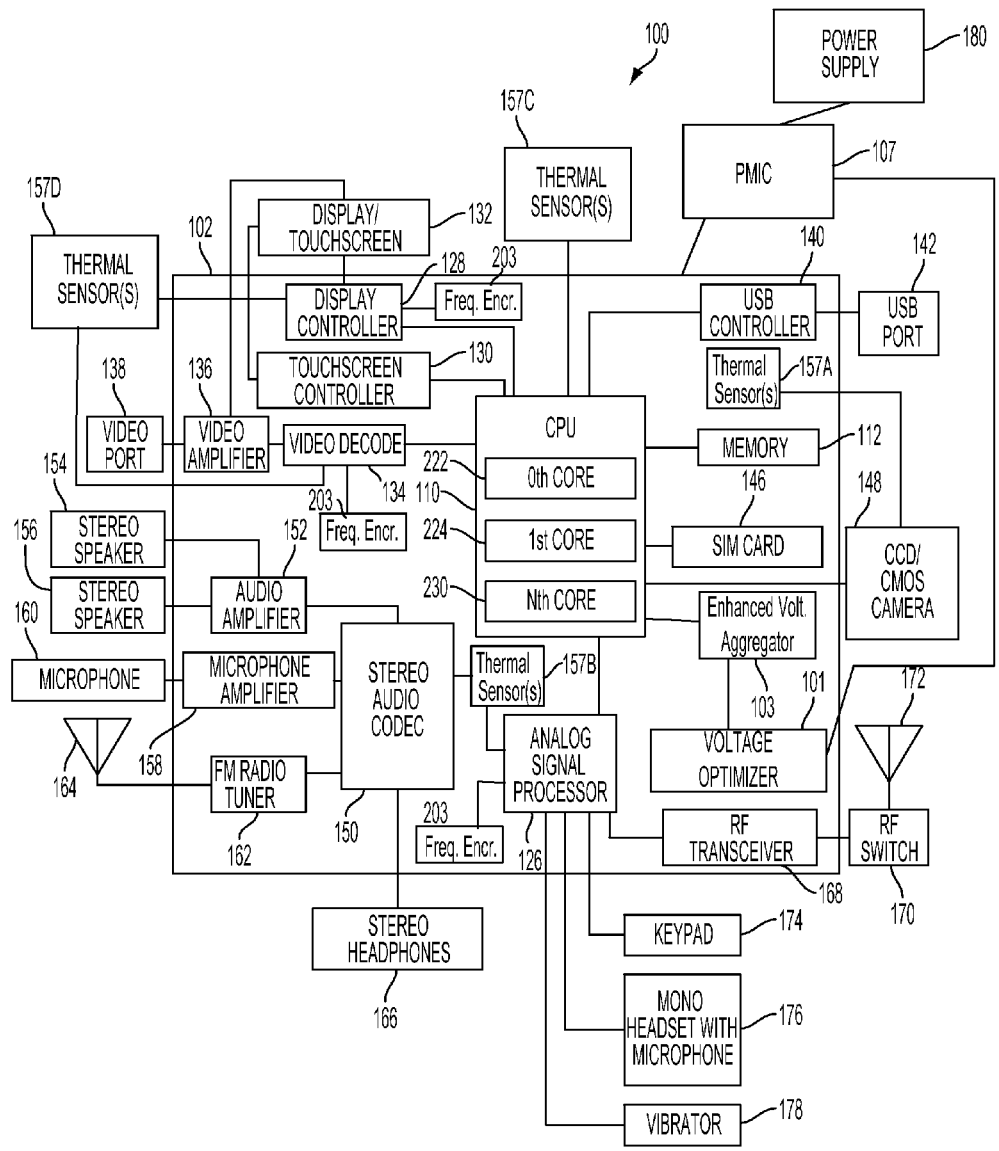
FIG. 1A is a functional block diagram illustrating an embodiment of a portable computing device ("PCD")

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

Referring to FIG. 1A, this figure is a functional block diagram of an exemplary, non-limiting aspect of a PCD 100 in the form of a wireless telephone for implementing methods and systems for optimizing a core voltage level of the PCD 100 and enhancing frequency performance of individual subcomponents in order to reduce power consumption within the PCD 100. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Instead of a CPU 110, a digital signal processor ("DSP") may also be employed as understood by one of ordinary skill in the art.

The CPU 110 may also be coupled to one or more internal, on-chip thermal sensors 157A-B as well as one or more external, off-chip thermal sensors 157C. The on-chip thermal sensors 157A-B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157 may produce a voltage drop (and/or a current) that is converted to digital signals with an analog-to-digital converter ("ADC") (not illustrated). However, other types of thermal sensors 157 may be employed without departing from the scope of the invention.

The PCD 100 of FIG. 1A may include an enhanced voltage aggregator 103 that is coupled to/and or is running on the CPU 110. The enhanced voltage aggregator 103 may comprise hardware, software, firmware, or a combination thereof. A voltage optimizer 101 may be coupled to/logically coupled to the enhanced voltage aggregator 103. Similar to the enhanced voltage aggregator 103, the voltage optimizer 101 may comprise hardware, software, firmware, or a combination thereof.

The enhanced voltage aggregator 103 may be responsible for collecting voltage "votes" from various subcomponents on the chip 102 and off-chip 102. After aggregating the voltage "votes," the enhanced voltage aggregator 103 may narrow or refine the voltage "votes" and send its output to the voltage optimizer 101. The voltage optimizer determines the optimal core voltage level for the PCD 100 and sends this optimal core voltage level to a power management integrated circuit ("PMIC") 107. Further details of the enhanced voltage aggregator 103 and voltage optimizer 101 will be described in more detail below in connection with FIG. 2.

Frequency performance enhancer modules 203, which may exist in each subsystem such as the camera subsystem 148, mobile display 128, 130 etc., may monitor the actual and present voltage level of the PCD 100. Each frequency performance enhancer module 203 may adjust the operating frequency of its respective subsystem as will be described below.

In a particular aspect, one or more of the method steps described herein may be implemented by executable instructions and parameters, stored in the memory 112, that may form software embodiments of the enhanced voltage aggregator 103, voltage optimizer 101, and frequency performance enhancer module 203. These instructions that form the enhanced voltage aggregator and voltage optimizer module(s) 101, 103 as well as the frequency performance enhancer module 203 may be executed by the CPU 110, the analog signal processor 126, or any other processor. Further, the processors, 110, 126, the memory 112, the instructions stored therein, or a combination thereof may serve as a means for performing one or more of the method steps described herein.

The PMIC 107 may be responsible for distributing power to the various hardware components present on the chip 102. The PMIC is coupled to a power supply 180. The power supply 180, may comprise a battery and it may be coupled to the on-chip system 102. In a particular aspect, the power supply may include a rechargeable direct current ("DC") battery or a DC power supply that is derived from an alternating current ("AC") to DC transformer that is connected to an AC power source.

As illustrated in FIG. 1A, a display controller 128 and a touchscreen controller 130 are coupled to the multi-core processor 110. A touchscreen display 132 external to the on-chip system 102 is coupled to the display controller 128 and the touchscreen controller 130.

FIG. 1A is a schematic diagram illustrating an embodiment of a portable computing device (PCD) that includes a video decoder 134. The video decoder 134 is coupled to the multicore central processing unit ("CPU") 110. A video amplifier 136 is coupled to the video decoder 134 and the touchscreen display 132. A video port 138 is coupled to the video amplifier 136. As depicted in FIG. 1A, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110.

Further, as shown in FIG. 1A, a digital camera or camera subsystem 148 may be coupled to the CPU 110. In an exemplary aspect, the digital camera/cameral subsystem 148 is a charge-coupled device ("CCD") camera or a complementary metal-oxide semiconductor ("CMOS") camera.

As further illustrated in FIG. 1A, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1A shows that a microphone amplifier 158 may be also coupled to the stereo audio CODEC 150. Additionally, a microphone 160 may be coupled to the microphone amplifier 158.

In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1A further indicates that a radio frequency ("RF") transceiver 168 may be coupled to the analog signal processor 126. An RF switch 170 may be coupled to the RF transceiver 168 and an RF antenna 172. As shown in FIG. 1A, a keypad 174 may be coupled to the analog signal processor 126. Also, a mono headset with a microphone 176 may be coupled to the analog signal processor 126. Further, a vibrator device 178 may be coupled to the analog signal processor 126.

As depicted in FIG. 1A, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102.

Figure 1B:
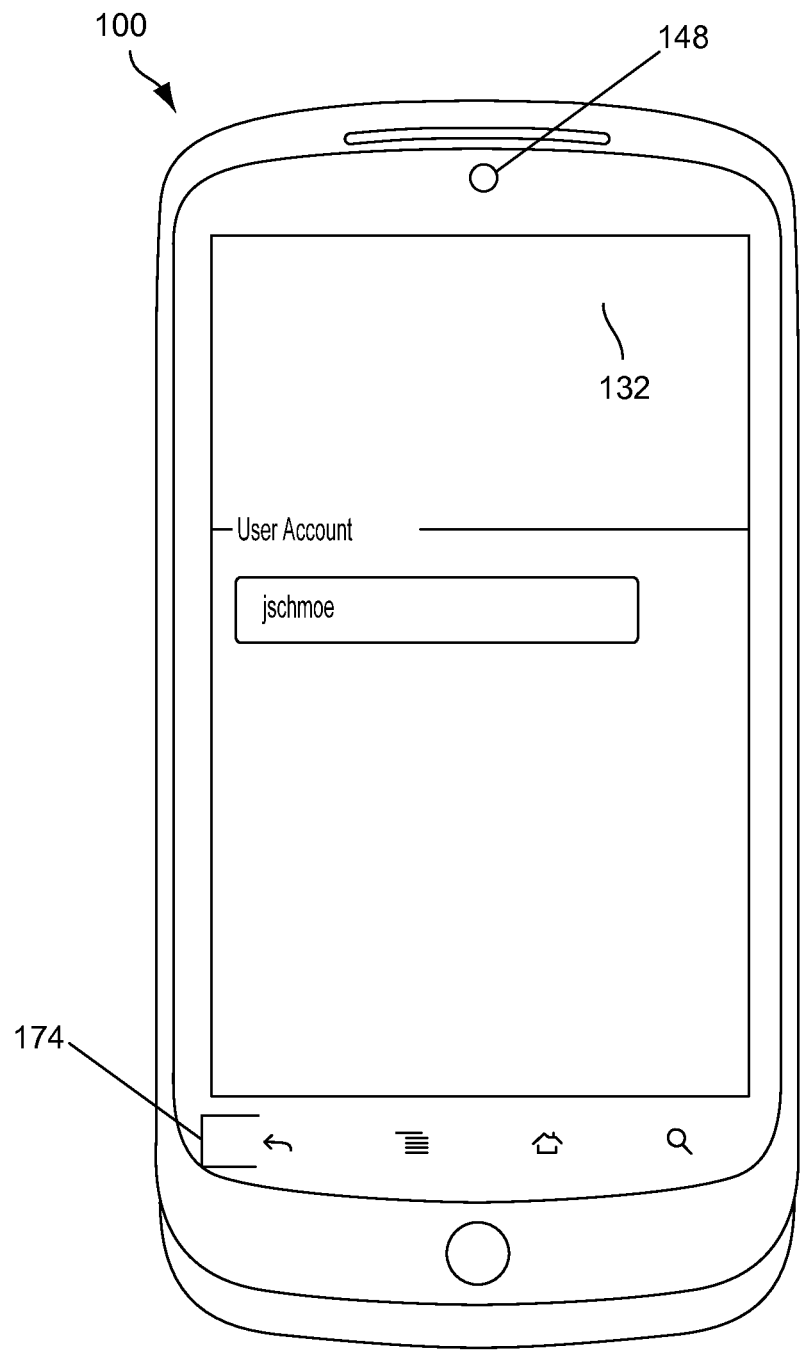
FIG. 1B is a front view of an exemplary embodiment of a portable computing device such as a mobile phone.

Referring now to FIG. 1B, this figure is a front view of one exemplary embodiment of a portable computing device ("PCD") 100 such as a mobile phone. The PCD 100 has a large touchscreen 132 in its mid-section and smaller keypad/buttons 174 near a lower, first end of the device 100. A "frontward/user" facing camera 148 may be positioned near a top, second end of the device 100. While a touchscreen type mobile phone 100 has been illustrated, other mobile phone types are possible and are within the scope of this disclosure, such as mobile phones 100 that have dedicated key boards which may be placed in a fixed position or which may be slideable inward (in a hidden position) and outward (in a visible/usable position) relative to the device 100.

Figure 2:
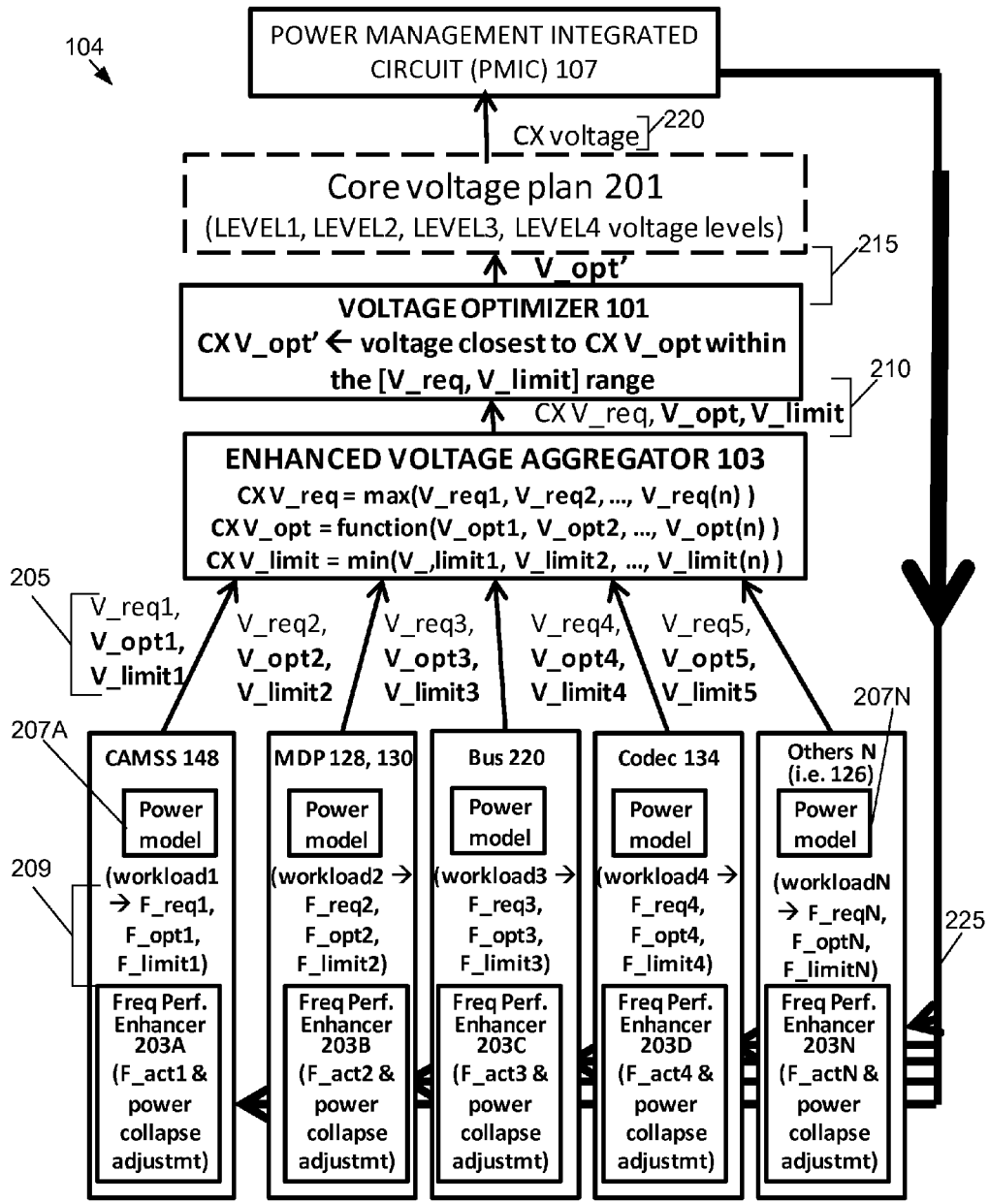
FIG. 2 is a functional block diagram illustrating an exemplary system for optimizing a core voltage level of a PCD and enhancing frequency performance of individual subcomponents in order to reduce power consumption within the PCD.

FIG. 2 is a functional block diagram illustrating an exemplary system 104 for optimizing a core voltage level of a PCD 100 and enhancing frequency performance of individual subcomponents (i.e., such as a camera subsystem 148, mobile display 128, 130, video codec 134, etc.) in order to reduce power consumption within the PCD 100. The system 104 may comprise the camera subsystem ("CAMSS") 148, the mobile display ("MDP") 128, 130, a system communication bus 220, a video codec 134, and other subsystems N within the mobile device 100 (i.e., such as, but not limited to, analog signal processor 126).

Each of these subsystems (CAMSS 148; MDP 128, 130; BUS 220; CODEC 134; etc.) through the N subsystem are (logically and/or directly) coupled to the enhanced voltage aggregator 103. The enhanced voltage aggregator 103 is (logically and/or directly) coupled to the voltage optimizer 101.

The voltage optimizer 101 provides an optimum voltage level 215 as output which will generally correspond to a core voltage plan 201. The core voltage plan 201 may comprise a plurality of voltage levels, such as a first level (Level 1), a second level (Level 2), a third level (Level 3), and a fourth level (Level 4) where the lower levels comprise less voltage and the higher levels comprise greater voltage. For example, the fourth level (Level 4) may closely track a "turbo" mode of operation for the mobile device 100 as understood by one of ordinary skill the art. The number and magnitude of the voltage levels may be increased or decreased and are well within the scope of this disclosure as understood by one of ordinary skill the art These individual voltage levels for the core voltage plan 201 may be selected based on the optimized voltage level 215 which is generated by the voltage optimizer 101.

Each of the subsystems—usually a CPU within a respective subsystem (CAMSS 148; MDP 128, 130; BUS 220; CODEC 134; etc.) may generate a plurality of voltage votes 205 which are transmitted to the enhanced voltage aggregator 103. The voltage votes 205 may comprise a required voltage level (V_req), an optimum voltage level (V_opt), and a maximum voltage level (V_limit). The maximum voltage level (V_limit) may comprise the maximum voltage available under the present power budget or electrical voltage constraint of the subsystem. The required voltage level (V_req) may comprise a minimum voltage required to run a particular subsystem at a minimum frequency level for its current workload. It is noted that, in some exemplary embodiments, the maximum voltage level (V_limit) may not be permitted to be selected/changed/voted upon by each subsystem.

Meanwhile, the optimum voltage level (V_opt) may comprise the voltage level for the most energy-efficient frequency based on the current temperature of the subsystem and its corresponding leakage current. As understood by one of ordinary skill the art, leakage current generally comprises a supply current ("Idd") measured in the quiescent (Q) state (when a circuit/chip is not switching and inputs are held at static values) and hence it abbreviation ("IDDQ"). To determine the optimal voltage level (V_opt), each subsystem may utilize either a power model 207 stored within each system or a lookup table (not illustrated) which is stored in each subsystem. Each power model 207 or the lookup table may comprise leakage current values ("IDDQ"), temperature values, frequency values, and an output power estimate. Each subsystem reviews its power model 207 or lookup table in order to determine its optimum voltage level (V_opt).

Once each subsystem (CAMSS 148; MDP 128, 130; BUS 220; CODEC 134; etc.) determines its three voltage votes 205, each transmits its three separate votes to the enhanced voltage aggregator 103. The enhanced voltage aggregator 103 summarizes or aggregates the votes 205 such that a single set 210 of three core ("CX") voltage votes comprising a single required core voltage level (CX V_req), a single optimum core voltage level (CX V_opt), and a single maximum core voltage level (CX V_limit) are communicated to the voltage optimizer 101.

To determine the required core voltage level (CX V_req), the enhanced voltage aggregator 103 determines this value according to the following equation:

$$CX\ V\_req = \max(V\_req1, V\_req2, \ldots, V\_req(n)) \quad [EQ1]$$

where the enhanced voltage aggregator 103 takes the maximum value of all available subsystem core voltage levels (V_req).

Similarly, to determine the maximum core voltage level (CX V_limit), enhanced voltage aggregator 103 determines this value according to the following equation:

$$CX\ V\_limit = \min(V\_limit1, V\_limit2, \ldots, V\_limit(n)) \quad [EQ2]$$

where the enhanced voltage aggregator 103 takes a minimum value of all available subsystem maximum voltage levels (V_limit).

To determine the optimum core voltage level (CX V_opt), the enhanced voltage aggregator 103 determines this value according to the following equation:

$$CX\ V\_opt = \text{function}(V\_opt1, V\_opt2, \ldots, V\_opt(n)) \quad [EQ3]$$

where this value derived from a function that incorporates all of the available subsystem optimum voltage levels (V_opt). This function may comprise a weighted average with power consumption of each subsystem as the weight value or a value with the minimum MSE (Mean Squared Error). However, other functions may be used as understood by one of ordinary skill in the art.

After receiving the single set 210 of three core ("CX") voltage votes, the voltage optimizer 101 narrows down the single set 210 to a single, optimized core voltage (V_opt prime') 215. The voltage optimizer 101 narrows down the single set 210 of voltage votes to the core voltage (V_opt prime') by determining the voltage closest to the optimum core voltage level (CX V_opt) which is within a range defined by the required core voltage level (CX V_req) and maximum core voltage level (CX V_limit).

The voltage optimizer 101 then transmits a single, optimized core voltage (V_opt prime') 215 to the core voltage plan selector module 201. The core voltage plan selector module 201 selects one of the predetermined voltage levels of the voltage plan which is closest to (V_opt prime') 215. This selection by the core voltage plan selector module 201 becomes the core voltage 220 for the entire PCD 100 and is communicated to the power management integrated circuit (PMIC) 107.

In some exemplary embodiments, several different voltage domains may co-exist within a PCD 100. This means that certain sub-components in the PCD 100 may run at different and independent voltage levels relative to each other and there may exist a voltage optimizer for each set of sub-components such that multiple voltage optimizers 101 may exist within the PCD 100.

The core voltage plan selector module 201 has been illustrated with dashed lines to indicate that this module 201 is optional. In some exemplary embodiments, the functions/operations of core voltage plan selector module 201 may be performed by the voltage optimizer 101 and, therefore, the core voltage plan selector module 201 may be eliminated as understood by one of ordinary skill the art.

Once the core voltage 220 has been established, frequency performance enhancer modules 203, which may exist in each subsystem such as the camera subsystem 148, mobile display 128, 130 etc., may monitor the actual and present voltage level of the PCD 100 as indicated by a monitoring line 225 (which is only conceptual/logical and not a physical line within PCD 100). Each frequency performance enhancer module 203 may monitor the temperature of its subsystem with thermal sensors 157 in parallel with monitoring the present voltage level of the PCD 100 as indicted by the conceptual monitoring line 225.

Each frequency performance enhancer module 203 may then estimate the leakage power for its subsystem based on the monitored voltage and current temperature of a respective subsystem (CAMSS 148; MDP 128, 130; BUS 220; CODEC 134; etc.). Once the leakage power has been estimated for a respective subsystem, the frequency performance enhancer module 203 may optimize the operating or actual frequency (F_act) of the subsystem as well as the power collapse duration of the subsystem based on this estimated leakage power in order to maximize the energy efficiency at the present voltage level being measured. The optimized operating or actual frequency (F_act) is usually the most energy-efficient operating frequency at the given or present core voltage level. The frequency performance enhancer module 203 may access a table to determine the most efficient F_act. See Table 1 below which lists available frequencies at a give voltage level for a particular subsystem (CAMSS 148; MDP 128, 130; BUS 220; CODEC 134; etc.). In this exemplary Table 1, the values presented are ones for a mobile display processor 128 subsystem. Each subsystem would have its own table/entries as understood by one of ordinary skill in the art. The frequency performance enhancer module 203 may perform calculations using the available frequencies at a present voltage level for a subsystem listed in a respective table for a respective subsystem (CAMSS 148; MDP 128, 130; BUS 220; CODEC 134; etc.).

TABLE 1

FREQUENCY RANGE - VOLTAGE TABLE
FOR FREQUENCY ENHANCER MODULE 203

| Subsystem | Voltage | Max Frequency | Frequency range supported by Subsystem at the designated voltage level |
|---|---|---|---|
| Mobile Display Processor 128 | 0.7 V | 75 MHz | 0~75 MHz |
| Mobile Display Processor 128 | 0.7875 V | 150 MHz | 76~150 MHz |
| Mobile Display Processor 128 | 0.9 V | 320 MHz | 151~320 MHz |
| Mobile Display Processor 128 | 1 V | 400 MHz | 321~400 MHz |

For example, the frequency performance enhancer model 203 may step up or step down the operating frequency for a particular subsystem of the PCD 100. Such an adjustment in operating frequency may minimize leakage power consumed by an individual subsystem of the PCD 100 as understood by one of ordinary skill the art.

In order to optimize the operating or actual frequency (F_act) of a subsystem (CAMSS 148; MDP 128, 130; BUS 220; CODEC 134; etc.), the frequency performance enhancer module 203 of a respective subsystem may find the highest possible frequency that a subsystem can run at the given voltage level from the PMIC 107 and the longest duration of power collapse in order to utilize any additional voltage margin on the shared power domain and minimize the leakage during idle time. The highest possible frequency may then be set as the optimized operating or actual frequency (F_act).

To find the highest possible frequency (F_act), the frequency performance enhancer module 203 may assess any-one of the following exemplary subsystem frequency parameters 209: (a) a present workload for the subsystem (workload); (b) the minimum operating frequency required to process the present workload (F_req); (c) the most energy-efficient (ideal) operating frequency available within the core voltage range (F_opt); and (d) and the maximum operating frequency available under the given power budget and/or voltage limits (F_limit).

In one exemplary embodiment, each frequency performance enhancer module 203 may assess the F_req, F_opt, and F_limit. The enhancer module 203 may set F_act higher than F_req value. The F_act usually should be lower than F_limit value from the subsystems (CAMSS 148; MDP 128, 130; BUS 220; CODEC 134; etc.). Within the range, F_act may be set by the frequency performance enhancer module 203 to the maximum frequency possible in the present voltage level of its respective subsystem to minimize the active (execution) time.

Figure 3A:
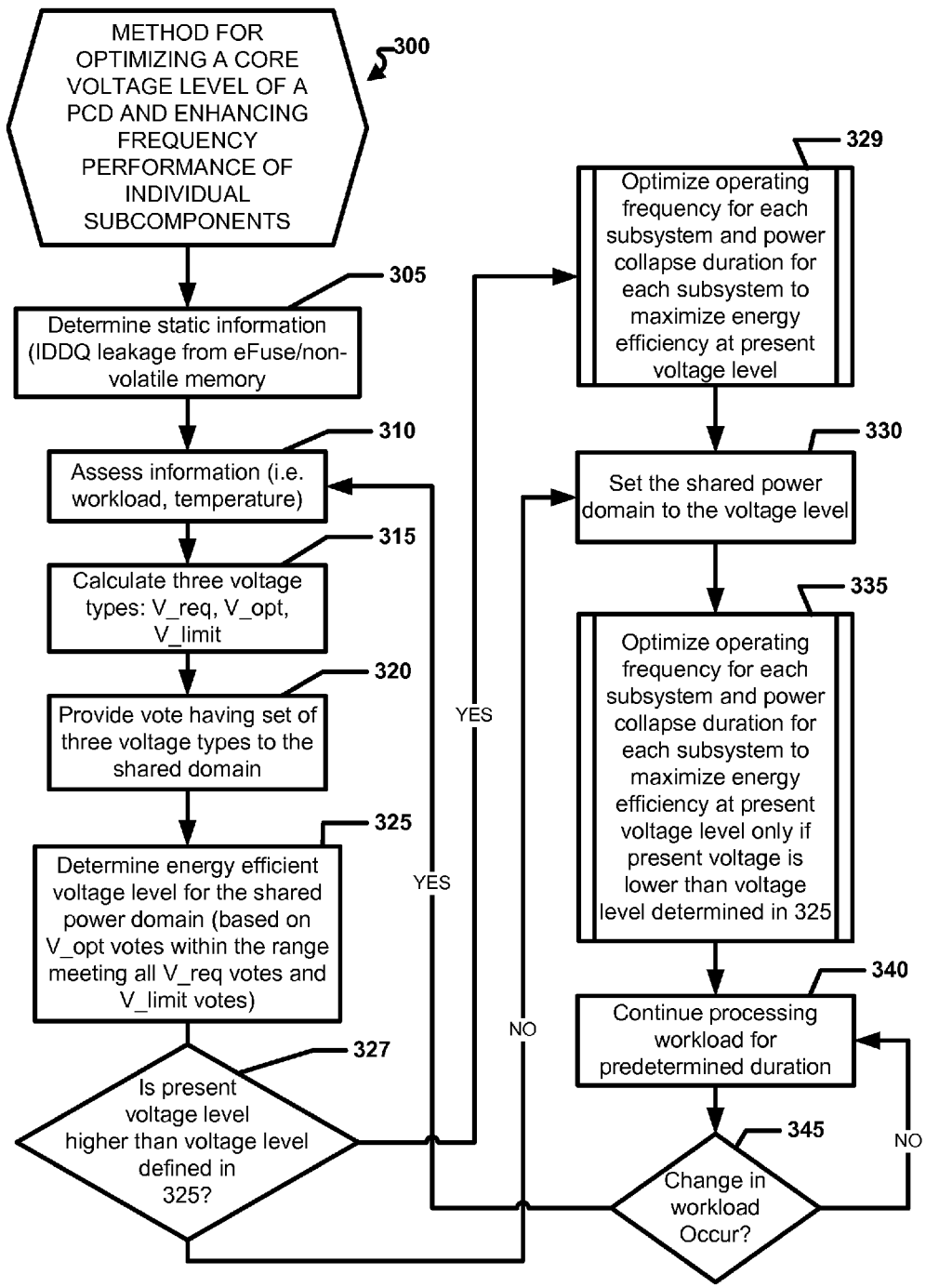
FIG. 3A is a logical flowchart illustrating a method for optimizing a core voltage level of a PCD and enhancing frequency performance of individual subcomponents in order to reduce power consumption within the PCD.

Referring now to FIG. 3A, this figure is a logical flowchart illustrating a method 300 for optimizing a core voltage level of a PCD 100 and enhancing frequency performance of individual subsystems within the PCD 100 in order to reduce power consumption within the PCD 100. Block 305 is the first step of method 300. In block 305, each subsystem (CAMSS 148; MDP 128, 130; BUS 220; CODEC 134; etc.) within the PCD 100 may determine static information. Such static information may include present levels of leakage current (IDDM) within a respective subsystem.

Next, in block 310, each subsystem—usually a CPU within a respective subsystem (CAMSS 148; MDP 128, 130; BUS 220; CODEC 134; etc.) may assess dynamic information within the PCD 100. Such dynamic information may include, but is not limited to, present temperature of each subsystem as well as the present workload of each subsystem.

In block 315, each subsystem—usually a CPU within a respective subsystem (CAMSS 148; MDP 128, 130; BUS 220; CODEC 134; etc.) may calculate a plurality of voltage values which correspond with the voltage votes 205 described above in connection with FIG. 2. Specifically, each subsystem may calculate at least three different voltage values comprising a required voltage level (V_req), an optimum voltage level (V_opt), and a maximum voltage level (V_limit).

Next, in block 320, the enhanced voltage aggregator 103 receives the plurality of voltage votes 205 from each of the subsystems (CAMSS 148; MDP 128, 130; BUS 220; CODEC 134; etc.) within the PCD 100. As described above in connection with FIG. 2, the enhanced voltage aggregator 103 summarizes or aggregates the voltage votes 205 such that a single set 210 of three core ("CX") voltage votes comprising a single required core voltage level (CX V_req), a single optimum core voltage level (CX V_opt), and a single maximum core voltage level (CX V_limit) are communicated to the voltage optimizer 101.

Subsequently, in block 325, the voltage optimizer 101 may determine a single, optimized core voltage (V_opt prime') 215 as described above in connection with FIG. 2 which is the energy-efficient voltage level for the shared power domain across the PCD 100. Next, in decision block 327, the voltage optimizer 101 determines if the present voltage level is higher than the single core voltage (V_opt prime') that was calculated in block 325. If the inquiry to decision block 327 is negative, then the "NO" branch is followed to block 330.

If the inquiry to decision block 327 is positive, then the "YES" branch is followed to routine block 329. In routine or submethod block 329, the operating frequency of each subsystem may (CAMSS 148; MDP 128, 130; BUS 220; CODEC 134; etc.) then be optimized with the frequency performance enhancer 203. Further, in this routine block 329, each frequency performance enhancer 203 may also optimize the power collapse duration for its respective subsystem in accordance with the optimized frequency. This optimization of operating frequency and power collapse duration may minimize leakage power for each subsystem within the PCD 100. Further details of routine block 329 will be described below in connection with FIG. 3B. This routine block 329 allows the frequency to be adjusted to optimized values for the voltage determined in step 325 prior to the voltage change in step 330.

In block 230, the voltage optimizer 101 may communicate the optimized core voltage (V_opt prime') 215 to the core voltage plan selector module 201. The core voltage plan selector module 201 may then select from one of a plurality of predetermined voltage levels (i.e. Level 1, Level 2, Level 3, Level 4, etc.) corresponding to the optimized core voltage (V_opt prime') 215. As noted above, alternatively, the voltage optimizer 101 may select the voltage level instead of the core voltage plan selector module 201 if the core voltage plan selector module 201 is not provided. The selected voltage level becomes the shared power domain voltage level for the entire PCD 100.

After the shared power domain voltage level has been set in block 330, then in routine or submethod block 335, the operating frequency of each subsystem may (CAMSS 148; MDP 128, 130; BUS 220; CODEC 134; etc.) then be optimized with the frequency performance enhancer 203 only if the voltage is going up. In other words, if decision block 327 is negative, the "NO" branch was followed, then this routine block 335 may be skipped as the frequency optimization would already have been performed in routine block 329. Further, in this routine block 335, each frequency performance enhancer 203 may also optimize the power collapse duration for its respective subsystem in accordance with the optimized frequency. This optimization of operating frequency and power collapse duration may minimize leakage power for each subsystem within the PCD 100.

As described above in connection with FIG. 2, each subsystem of the PCD 100 may be provided with a frequency performance enhancer 203 which may comprise hardware, software, and/or a combination thereof. Each frequency performance enhancer 203 of a respective subsystem may perform a few different calculations in order to optimize its operating frequency and to calculate its optimal power collapse duration. Further details of this routine block 335 will be described below in connection with FIG. 3B.

After routine block 335, in block 340, each subsystem will continue processing its respective workload for a predetermined duration. Subsequently, in decision block 345, each subsystem—usually a CPU within a respective subsystem (CAMSS 148; MDP 128, 130; BUS 220; CODEC 134; etc.) may then determine if its workload has changed, since a change in workload may impact what is the optimal operating frequency and optimal voltage for the shared power domain within the PCD 100.

If the inquiry to decision block 345 is negative, then the "NO" branch is followed back to block 340. If the inquiry to decision block 345 is positive, then the "YES" branch is followed back to block 310.

Figure 3B:
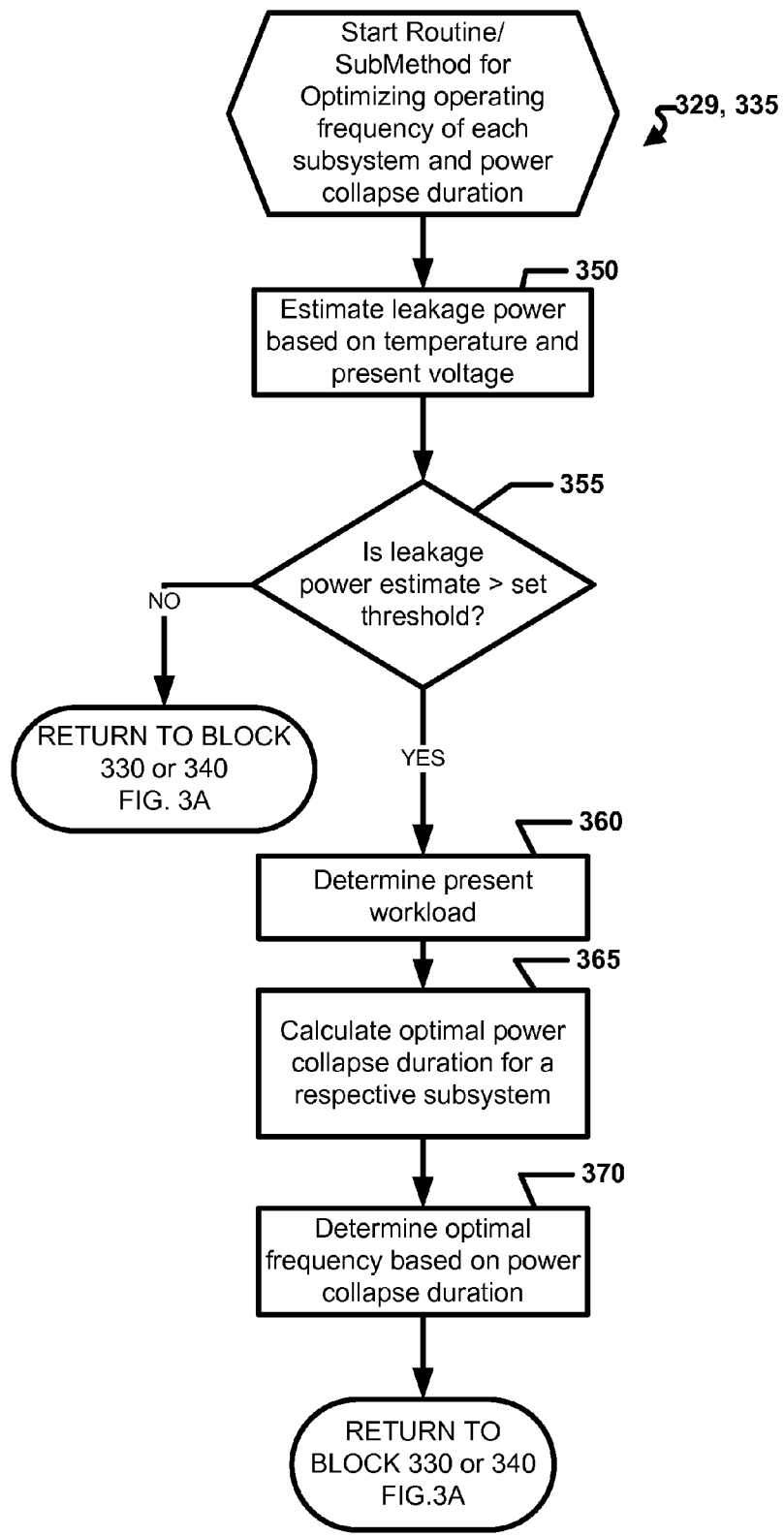
FIG. 3B is a logical flowchart illustrating a submethod or routine of the method of FIG. 3A for optimizing the operating frequency of subsystems and optimizing power collapse duration of subsystems within the PCD.

Referring now to FIG. 3B, submethod or routine 229, 335 of the method 300 of FIG. 3A for optimizing the operating frequency of subsystems and optimizing power collapse duration of subsystems within the PCD 100. Block 350 is the first block of submethod or routine 335. In block 350, each frequency performance enhancer 203 of a respective subsystem (CAMSS 148; MDP 128, 130; BUS 220; CODEC 134; etc.) may estimate its leakage power based on its present temperature as measured by thermal sensors 157 and the present voltage which was established in block 330.

Next, in decision block 355, each frequency performance enhancer 203 may determine if its leakage power estimate for its respective subsystem (CAMSS 148; MDP 128, 130; BUS 220; CODEC 134; etc.) is greater than a set or predetermined threshold. This set or predetermined threshold of leakage power may be statically set or dynamically set as desired by a manufacture of the PCD 100.

If the inquiry to decision block 355 is negative, then the "NO" branch is followed and the sub method 335 returns to either block 329 or 340 of FIG. 3A. If the inquiry to decision block 355 is positive, then the "YES" branch is followed to block 360.

In block 360, the frequency performance enhancer 203 of each respective subsystem (CAMSS 148; MDP 128, 130; BUS 220; CODEC 134; etc.) may determine the present workload of a respective subsystem. Next, in block 365, the frequency performance enhancer module 203 of a respective subsystem may find the highest possible frequency that a subsystem may run at the given voltage level from the PMIC 107 and the longest duration of power collapse in order to utilize any additional voltage margin on the shared power domain and minimize the leakage during idle time. Further details of block 365 will be described below in connection with FIG. 4. In block 370, the highest possible frequency may then be set by the frequency performance enhancer module 203 as the optimized operating or actual frequency (F_act) based on this power collapse duration. The method then returns to either block 329 or 340 of FIG. 3A.

In one exemplary embodiment and in addition to the power collapse duration calculation in block 365, each frequency performance enhancer module 203 in block 365 may assess the F_req, F_opt, and F_limit calculated by each subsystem (CAMSS 148; MDP 128, 130; BUS 220; CODEC 134; etc.). As described above, the frequency performance enhancer module 203 may access a table to determine the most efficient F_act. See Table 1 above which lists available frequencies at a give voltage level for a particular subsystem (CAMSS 148; MDP 128, 130; BUS 220; CODEC 134; etc.). In this exemplary Table 1, the values presented are ones for a mobile display processor 128 subsystem. F_act may be set by the enhancer module 203 higher than F_req value. The frequency performance enhancer module 203 will usually set the F_req value lower than the F_limit value from the other subsystems. Within the range, the enhancer module may set F_act to the maximum frequency possible in the present voltage level of its respective subsystem (CAMSS 148; MDP 128, 130; BUS 220; CODEC 134; etc.) to minimize the active (execution) time.

Figure 4:
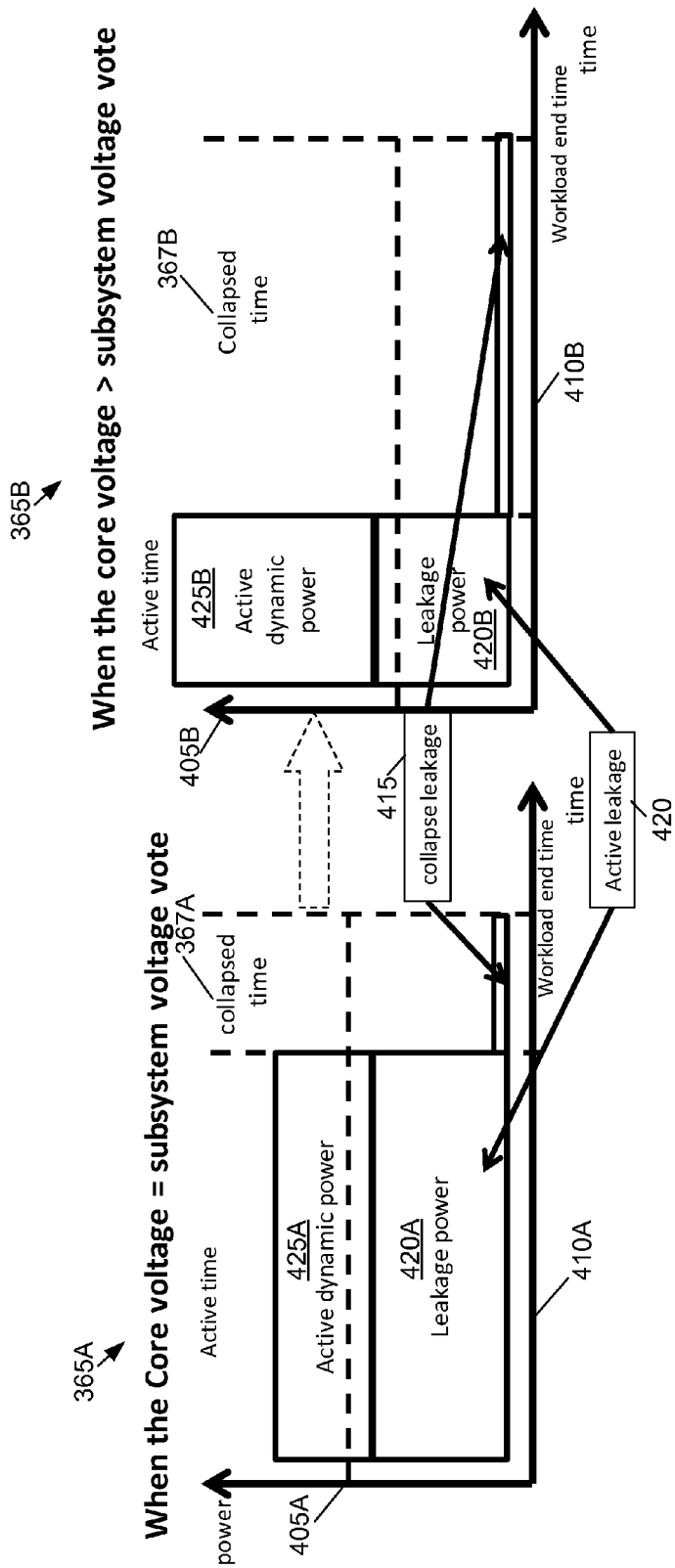
FIG. 4 is an illustration of two graphs useful in a power collapse duration calculation by a respective frequency performance enhancer module.

Referring now to FIG. 4, this figure is an illustration of two graphs 365A-B useful in a power collapse duration calculation by a respective frequency performance enhancer module 203. As noted above, in block 365 of FIG. 3B, the frequency performance enhancer module 203 of a respective subsystem may find the highest possible frequency that a subsystem can run at the given voltage level from the PMIC 107 and the longest duration of power collapse in order to utilize any additional voltage margin on the shared power domain and minimize the leakage during idle time.

To find the highest possible frequency for a respective subsystem (CAMSS 148; MDP 128, 130; BUS 220; CODEC 134; etc.), the frequency performance enhancer module 203 may evaluate active dynamic power and leakage power lost by plotting power values over time as illustrated in FIG. 4. A first power collapse duration calculation plot 365A may comprise a graph having an Y-axis 405A that tracks power of a subsystem plotted against a X-axis 410A which tracks workload time for the subsystem. For example, if the subsystem comprises a CODEC 134, then the workload and workload end time may track video frame duration for video data.

In the first graph 365 of power collapse duration, the core voltage of the codec subsystem 134 may be set equal to the voltage vote submitted by the code subsystem 134 to the enhanced voltage aggregator 103. This voltage setting yields an active dynamic power consumption 425A having a first duration as well as a leakage power loss 420A having a first duration. The voltage setting also yields a collapsed power state 367A having a first duration.

If the core voltage value (CX_voltage) 220 of the entire system 104 is greater than the voltage vote of the subsystem, such as the CODEC subsystem 134, the frequency performance enhancer module 203 may experiment with higher frequency in order to reduce leakage power loss 420B and increasing the collapsed power state 367B of the subsystem 134. Such increases in voltage for the subsystem 134 may allow the subsystem 134 to run at a higher frequency allow the subsystem 134 to finish its workload more quickly and which in turn, increases the duration of the collapsed power state 367B as illustrated in FIG. 4. This means that a same workload illustrated in the first graph 365A may be completed in a shorter amount of time as illustrated in the second graph 365B when both voltage and operating frequency of the subsystem 134 are increased. According to another exemplary embodiment not illustrated, the voltage optimizer 101 and/or the voltage aggregator may only receive votes on V_req (as in must run this fast so need this voltage) and not either V_opt or V_limit.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may include any means that may store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Computer-readable media include both computer storage media and communication media including any medium that facilitates transfer of a computer program from one place to another. A storage media may be any available media that may be accessed by a computer. By way of example, and not limitation, such computer-readable media may comprise any optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for regulating a core voltage level of a portable computing device and enhancing frequency performance of individual subcomponents, the method comprising:
   receiving a plurality of voltage value votes from a plurality of subcomponents within the portable computing device, wherein all of the plurality of subsystems are associated with a common power domain, the voltage value votes generated by each of the plurality of subcomponents and comprising for each of the subcomponents:
      a required voltage level (V_req) corresponding to a minimum voltage required to operate the subcomponent under a current workload,
      a maximum voltage level (V_limit) corresponding to a maximum voltage available to the subsystem, and
      a desired voltage level (V_opt) corresponding to a most energy efficient voltage level for the subsystem;
   calculating a reduced set of V_req, V_limit, and V_opt voltage values for the portable computing device based on the plurality of received voltage value votes from the plurality of subsystems;
   determining a desired core voltage value from the reduced set of V_req, V_limit, and V_opt voltage values that results in a reduced power consumption by the portable computing device;
   determining whether a present voltage level is lower than the desired core voltage level; and
   if the present voltage level is lower than the desired core voltage level, first setting all of the plurality of subcomponents to the desired core voltage value by setting the common power domain shared by the plurality of subcomponents to the desired core voltage value, wherein the power domain is set by instructing a controllable power supply circuit, and then regulating an operating frequency of one or more of the plurality of subcomponents to reduce power consumption of the subcomponent.

2. The method of claim 1, further comprising: if the present voltage level is higher than the desired core voltage level, first regulating the operating frequency of one or more of the plurality of subcomponents to reduce power consumption of the subcomponent and then setting all of the plurality of subcomponents to the desired core voltage value.

3. The method of claim 1, wherein at least one subcomponent comprises one of a camera, a display, a communication bus, a video coder, a video decoder, and a signal processor.

4. The method of claim 1, further comprising estimating leakage power of a subcomponent based on at least one of the temperature and the core voltage value.

5. The method of claim 4, further comprising determining a present workload of a subcomponent.

6. The method of claim 5, further comprising determining a desired power collapse duration corresponding to processing the present workload.

7. The method of claim 6, further comprising determining an ideal operating frequency available based on the desired power collapse duration.

8. The method of claim 1, further comprising performing calculations with at least two different voltage values for completing a present workload.

9. The method of claim 8, further comprising calculating leakage power corresponding to the different voltage values.

10. The method of claim 1, wherein the portable computing device comprises at least one of a mobile telephone, a personal digital assistant, a pager, a smartphone, a navigation device, and a hand-held computer with a wireless connection or link.

11. A computer system for regulating a core voltage level of a portable computing device and enhancing frequency performance of individual subcomponents within the portable computing device, the system comprising:
a processor operable for:
receiving a plurality of voltage value votes from a plurality of subcomponents within the portable computing device, wherein all of the plurality of subsystems are associated with a common power domain, the voltage value votes generated by each of the plurality of subcomponents and comprising for each of the subcomponents a required voltage level (V_req) corresponding to a minimum voltage required to operate the subcomponent under a current workload, a maximum voltage level (V_limit) corresponding to a maximum voltage available to the subsystem, and a desired voltage level (V_opt) corresponding to a most energy efficient voltage level for the subsystem;
calculating a reduced set of V_req, V_limit, and V_opt voltage values for the portable computing device based on the plurality of received voltage value votes from the plurality of subsystems;
determining a desired core voltage value from the reduced set of V_req, V_limit, and V_opt voltage values that results in a reduced power consumption by the portable computing device;
determining whether a present voltage level is lower than the desired core voltage level; and
if the present voltage level is lower than the desired core voltage level, first setting all of the plurality of subcomponents to the desired core voltage value by setting the common power domain shared by the plurality of subcomponents to the desired core voltage value, wherein the power domain is set by instructing a controllable power supply circuit, and then regulating an operating frequency of one or more of the plurality of subcomponents to reduce power consumption of the subcomponent.

12. The system of claim 11, wherein the processor is operable for: if the present voltage level is higher than the desired core voltage level, first regulating the operating frequency of one or more of the plurality of subcomponents to reduce power consumption of the subcomponent and then setting all of the plurality of subcomponents to the desired core voltage value.

13. The system of claim 11, wherein at least one subcomponent comprises one of a camera, a display, a communication bus, a video coder, a video decoder, and a signal processor.

14. The system of claim 11, wherein the processor is operable for estimating leakage power of a subcomponent based on at least one of the temperature and the core voltage value.

15. The system of claim 14, wherein the processor is operable for determining a present workload of a subcomponent.

16. The system of claim 15, wherein the processor is operable for determining a desired_power collapse duration corresponding to processing the present workload.

17. The system of claim 16, wherein the processor is operable for determining an ideal operating frequency available based on the desired power collapse duration.

18. The system of claim 11, wherein the processor is operable for performing calculations with at least two different voltage values for completing a present workload.

19. The system of claim 12, wherein the processor is operable for calculating leakage power corresponding to the different voltage values.

20. The system of claim 11, wherein the portable computing device comprises at least one of a mobile telephone, a personal digital assistant, a pager, a smartphone, a navigation device, and a hand-held computer with a wireless connection or link.

21. A computer system for regulating a core voltage level of a portable computing device and enhancing frequency performance of individual subcomponents within the portable computing device, the system comprising:
means for receiving a plurality of voltage value votes from a plurality of subcomponents within the portable computing device, wherein all of the plurality of subsystems are associated with a common power domain, the voltage value votes generated by each of the plurality of subcomponents and comprising for each of the subcomponents a required voltage level (V_req) corresponding to a minimum voltage required to operate the subcomponent under a current workload, a maximum voltage level (V_limit) corresponding to a maximum voltage available to the subsystem, and a desired voltage level (V_opt) corresponding to a most energy efficient voltage level for the subsystem;
means for calculating a reduced set of V_req, V_limit, and V_opt voltage values for the portable computing device based on the plurality of received voltage value votes from the plurality of subsystems;
means for determining a desired core voltage value from the reduced set of V_req, V_limit, and V_opt voltage values that results in a reduced power consumption by the portable computing device;
means for determining whether a present voltage level is lower than the desired core voltage level; and
if the present voltage level is lower than the desired core voltage level, means for first setting all of the plurality of subcomponents to the desired core voltage value and then regulating an operating frequency of one or more of the plurality of subcomponents to reduce power consumption of the subcomponent.

22. The system of claim 21, further comprising: if the present voltage level is higher than the desired core voltage level, means for first regulating an operating frequency of one or more of the plurality of subcomponents to reduce power consumption of the subcomponent and then setting all of the plurality of subcomponents the desired core voltage value.

23. The system of claim 21, wherein at least one subcomponent comprises one of a camera, a display, a communication bus, a video coder, a video decoder, and a signal processor.

24. The system of claim 21, further comprising means for estimating leakage power of a subcomponent based on at least one of the temperature and the core voltage value.

25. The system of claim 24, further comprising means for determining a present workload of a subcomponent.

26. A computer program product comprising a non-transitory computer usable medium having a computer readable program code embodied therein, said computer readable program code adapted to be executed to implement a method for regulating a core voltage level of a portable computing device and enhancing frequency performance of individual subcomponents within the portable computing device, said method comprising:

receiving a plurality of voltage value votes from a plurality of subcomponents within the portable computing device, wherein all of the plurality of subsystems are associated with a common power domain, the voltage value votes generated by each of the plurality of subcomponents and comprising for each of the subcomponents a required voltage level (V_req) corresponding to a minimum voltage required to operate the subcomponent under a current workload, a maximum voltage level (V_limit) corresponding to a maximum voltage available to the subsystem, and a desired voltage level (V_opt) corresponding to a most energy efficient voltage level for the subsystem;

calculating a reduced set of V_req, V_limit, and V_opt voltage values for the portable computing device based on the plurality of received voltage value votes from the plurality of subsystems;

determining a desired core voltage value from the reduced set of V_req, V_limit, and V_opt voltage values that results in a reduced power consumption by the portable computing device;

determining whether a present voltage level is lower than the desired core voltage level; and if the present voltage level is lower than the desired core voltage level, first setting all of the plurality of subcomponents to the desired core voltage value by setting the common power domain shared by the plurality of subcomponents to the desired core voltage value, wherein the power domain is set by instructing a controllable power supply circuit, and then regulating an operating frequency of one or more of the plurality of subcomponents to reduce power consumption of the subcomponent.

27. The computer program product of claim 26, wherein the program code implementing the method further comprises: if the present voltage level is higher than the desired core voltage level, first regulating an operating frequency of one or more of the plurality of subcomponents to reduce power consumption of the subcomponent and then setting all of the plurality of subcomponents the desired core voltage value.

28. The computer program product of claim 26, wherein at least one subcomponent comprises one of a camera, a display, a communication bus, a video coder, a video decoder, and a signal processor.

29. The computer program product of claim 26, wherein the program code implementing the method further comprises estimating leakage power of a subcomponent based on at least one of the temperature and the core voltage value.

30. The computer program product of claim 29, wherein the program code implementing the method further comprises determining a present workload of a subcomponent.

* * * * *